No. 608,193. Patented Aug. 2, 1898.
M. T. GORDON.
DERRICK FOR RAISING OR LOWERING TELEGRAPH POLES.
(Application filed Feb. 17, 1898.)
(No Model.) 2 Sheets—Sheet 1.
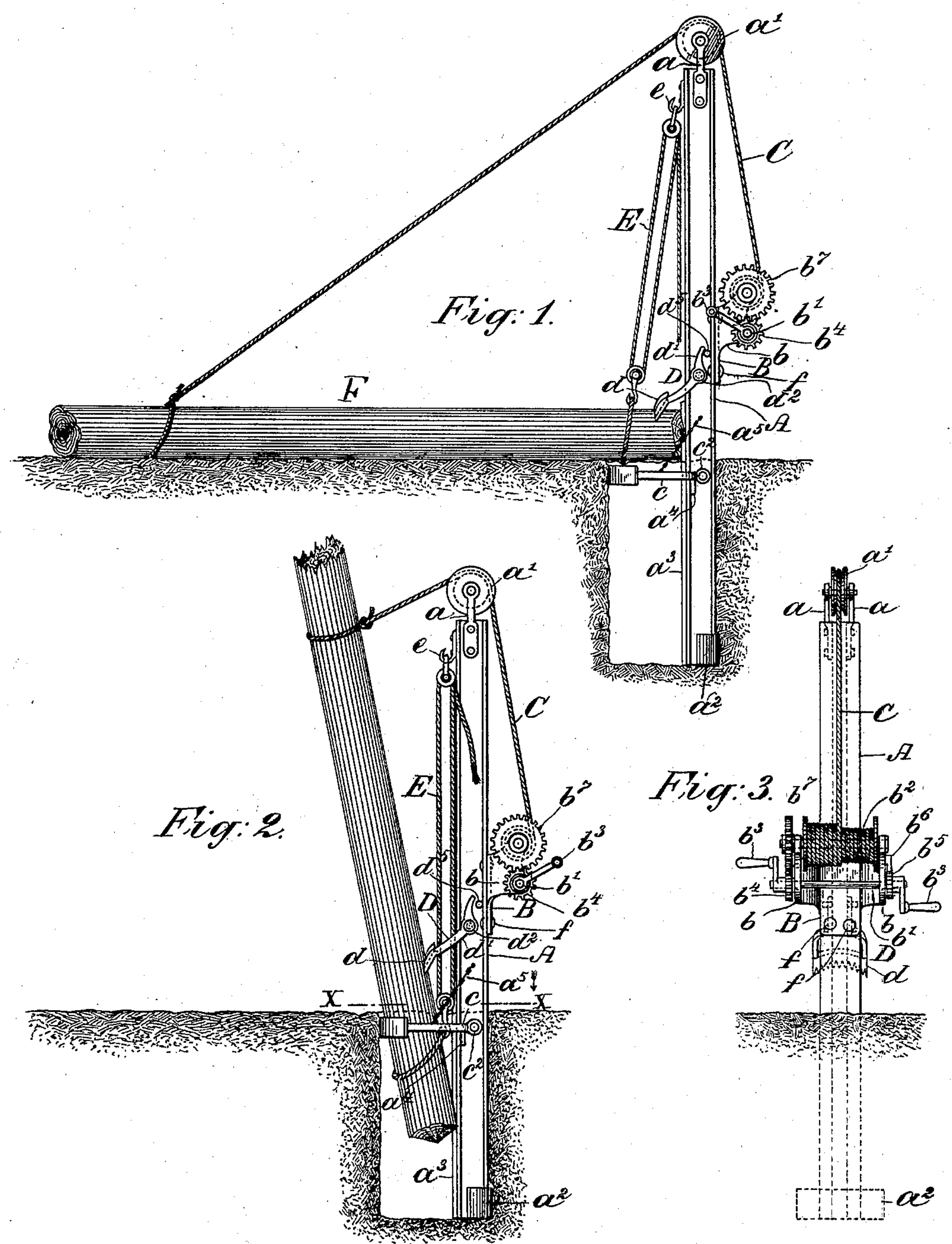
WITNESSES:
J. W. Ulman
R. F. Sweeny
INVENTOR
Minthorne T. Gordon
BY Wm. H. Appleton,
ATTORNEY.
THE NORRIS PETERS CO., PHOTO-LITHO., WASHINGTON, D. C.

No. 608,193. Patented Aug. 2, 1898.
M. T. GORDON.
DERRICK FOR RAISING OR LOWERING TELEGRAPH POLES.
(No Model.) (Application filed Feb. 17, 1898.)
2 Sheets—Sheet 2.
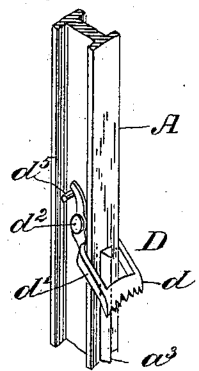
Fig: 6.
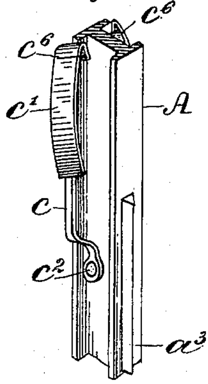
Fig: 5.
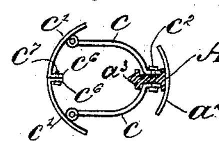
Fig: 7.
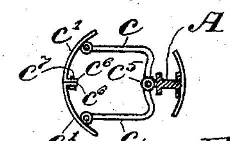
Fig: 8.
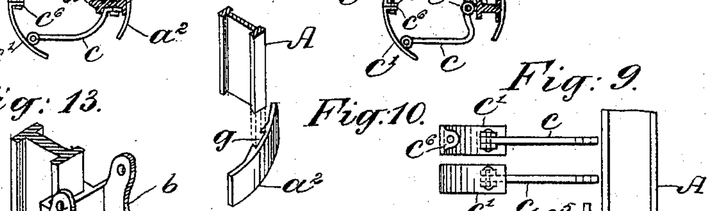
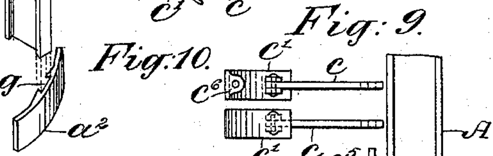
Fig: 10.
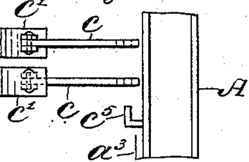
Fig: 9.
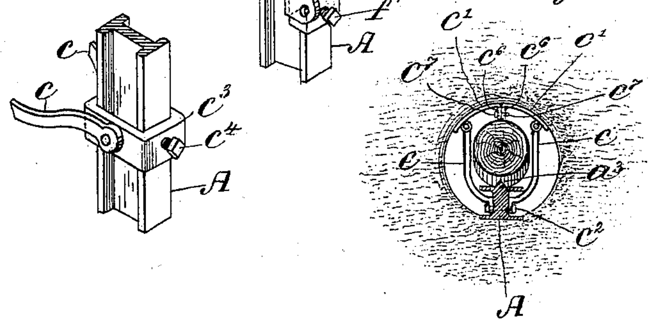
Fig: 13. Fig: 11. Fig: 4. Fig: 12.
WITNESSES:
F. W. Wiman
R. F. Sweeny.
INVENTOR
Minthorne T. Gordon
BY Wm. H. Appleton,
ATTORNEY.
THE NORRIS PETERS CO., PHOTO-LITHO., WASHINGTON, D. C.

UNITED STATES PATENT OFFICE.

MINTHORNE T. GORDON, OF NEW YORK, N. Y., ASSIGNOR OF ONE-HALF TO JOHN L. FEENY, OF SAME PLACE.

DERRICK FOR RAISING OR LOWERING TELEGRAPH-POLES.

SPECIFICATION forming part of Letters Patent No. 608,193, dated August 2, 1898.

Application filed February 17, 1898. Serial No. 670,607. (No model.)

*To all whom it may concern:*

Be it known that I, MINTHORNE T. GORDON, a citizen of the United States, and a resident of New York, (Stapleton,) in the county of Richmond and State of New York, have invented certain new and useful Improvements in Derricks for Raising or Lowering Telegraph and other Poles, of which the following is a specification.

My invention is designed for either raising telegraph and other poles from a recumbent to a vertical position and properly setting them in the holes previously formed to receive them or for lowering them from a vertical to a recumbent position when it is desired to remove them from the holes in which they have been previously secured, its object being to provide an apparatus of this class which while simple in construction and powerful in operation shall at the same time be portable in character and capable of use in yielding and other kinds of ground.

To these ends the invention consists, first, in a suitable mast or post which is adapted to enter the hole designed for the telegraph or other pole and is provided with means whereby it may be held in the proper upright position therein against the strain put upon it in the raising or lowering of such pole and of means whereby the pole may be raised or lowered therefrom, and, second, in various other constructions and combinations of parts subsidiary thereto, all as will hereinafter more fully appear.

Referring to the accompanying drawings, which form a part of this specification, Figure 1 is a vertical sectional elevation of a hole, with a derrick constructed in accordance with my invention arranged therein, showing also a telegraph or other pole with which it is connected ready for being raised; Fig. 2, a similar view of the hole, derrick, and pole, with the pole raised to nearly an upright position; Fig. 3, a rear elevation of the derrick seated in the hole for the pole ready for operation; Fig. 4, a transverse horizontal section of the derrick and pole, taken in the plane $x$ $x$ of Fig. 2, with the pole occupying nearly a vertical position; Fig. 5, an isometric projection of a portion of the mast or post of the derrick, showing also the devices through which the derrick is held in an upright position when raising or lowering the pole swung upward into an inoperative position; Fig. 6, a similar projection of the mast or post of the derrick, with the holding-dog for engaging with and holding the lower end of the pole from an upward movement during the raising or lowering of the pole; Fig. 7, a transverse section of the derrick, also taken in the plane $x$ $x$ of Fig. 2, with the pole omitted; Fig. 8, a similar transverse section, taken in the same plane, of a slightly-modified form of devices for holding the derrick in an upright position when raising or lowering a pole; Fig. 9, a side elevation of a portion of the mast or post and the devices for holding the derrick in an upright position when raising or lowering the pole, of the form shown in Fig. 8, with the members of these devices separated from each other and from the pintle upon which they are normally supported; Fig. 10, an isometric projection of a portion of the mast or post of the derrick and the bearing-plate on its lower end, the latter being separated from the former; Fig. 11, an isometric projection of a portion of the mast or post of the derrick and of the devices for holding it in an upright position when raising or lowering the pole, with a modified arrangement for securing them adjustably thereto; Fig. 12, a similar projection of the mast or post of the derrick and of the holding-dog, showing also a modified arrangement for securing the latter adjustably to the former; and Fig. 13, a like projection of a portion of the mast or post of the derrick and of the bracket of the winch, with the latter arranged upon the former in such a manner as to be adjustable thereon.

In all the figures like letters of reference indicate corresponding parts.

A indicates the mast or post, which constitutes the main or body portion of the derrick, and is provided at its upper end with suitable hangers $a$, in and between which is journaled a sheave $a'$, and at its lower end with a bearing-plate $a^2$, through which the cutting or pressing of the lower end of the mast or post back into the side of the pole-hole is prevented when the raising or lowering of a pole is being effected and the ground in which the hole is formed is of a soft or yielding nature.

In the construction of the mast or post and the bearing-plate thereon either metal, wood, or other materials may be employed. I prefer, however, to construct them of metal and to make the former in the shape of an ordinary I-beam, with a V-shaped flange $a^3$ extending longitudinally of the lower portion of its face, and the latter of a plate of the requisite length and breadth and in curvilinear form of approximately the same radius as that of the hole in which the derrick is to be used.

Secured to the mast or post A is a bracket B, which is constructed with appropriately-shaped cheeks $b$, in and extending between which are journaled the shaft $b'$ and the drum $b^2$. The shaft $b'$ is preferably provided at its ends with suitable cranks $b^3$ and between these with a pinion $b^4$ and a ratchet $b^5$, the former of which meshes with a spur-gear $b^7$, fixedly secured to the axis of the drum $b^2$, and serves to communicate a rotary motion thereto, and the latter of which coöperates with a suitable pawl $b^6$ to prevent the backward rotation of the shaft when required. The pinion $b^4$ in practice is made considerably smaller than the spur-gear $b^7$, whereby to increase the power transmitted from the crank-shaft $b'$ to the drum, and with such gear, shaft, drum, bracket, and cranks it constitutes a winch through which the power to raise the pole or hold it while being lowered is exerted.

From the drum $b^2$, around which it is either coiled or uncoiled, as the case may be, in the operation of the machine, extends a rope or chain C, which passes upward over the sheave $a'$ and serves as the means whereby the power exerted by the winch is communicated to the pole.

For maintaining the mast or post A in an upright position when placed in a pole-hole and the derrick operated to raise or lower a pole various means may be employed. I prefer, however, to make use of the two curved arms or struts $c$, which extend outward from the mast or post A across the hole around the space that is occupied by the pole when one is present, and are each provided at its end with a curvilinear plate $c'$, which is hinged thereto on a vertical axis and is of approximately the same radius as that of the hole in which the pole is to be set or that from which it is to be removed. In some instances these arms or struts $c$ are pivoted to the sides of the mast or post A by a bolt $c^2$, passing horizontally therethrough and through the mast or post, as shown in Figs. 1, 2, 4, 5, and 7. In other instances they are pivoted to a sleeve $c^3$, that surrounds the mast or post, whereby to be vertically adjustable thereon, and are held in adjusted position by a clamping-screw $c^4$, as shown in Fig. 11, while in still other instances they are detachably supported upon a pintle $c^5$, projecting either from the face of the mast or post or from a sleeve adjustably secured thereon, as shown in Figs. 8 and 9. Any one of these forms of construction may be adopted, as preferred, it only being essential that, whatever the form selected may be, the arms $c$ be made of such length that when the mast or post A is standing in the pole-hole on one side thereof they extend approximately across such hole with the curvilinear plates $c'$, hinged to their free ends, bearing against the other side of the same or against a suitable blocking interposed between it and the plates. As thus constructed and arranged a firm and reliable support against the lateral strain occasioned by the raising and lowering of a pole or otherwise is afforded to the mast or post and provisions made for either removing them from or carrying them around the pole when it is desired to remove the derrick from the hole or place it therein.

With the arms or struts $c$ pivoted to the sides of the mast or post A or to an adjustable sleeve $c^3$ thereon I sometimes find it convenient to employ a stop $a^4$, whereby to hold them in a horizontal position when the derrick is arranged in a hole for operation, and this may be secured in proper position for contact with the under side of one or both of such arms or struts on the side of the mast or post or on the sleeve, as the pivoting of these arms or struts is to one or the other of these members. I prefer, however, to employ a cord or chain $a^5$ for this purpose, which, connected at one of its ends with the arms or struts $c$ and at the other with the mast or post, permits not only of the arms being held in a horizontal position, but at any other angle with respect thereto that the exigencies of the hole or the desire of the operator may require.

In some cases it may be found desirable to so construct the curvilinear plate $c'$ on the arms or strut $c$ as to permit of the independent action of each. In my preferred form of construction, however, the inner contiguous ends of these plates are connected when the derrick is arranged in a hole ready for operation, and to permit of this being accomplished I provide each of these ends with an inwardly-extending flange $c^6$, through a hole in which and through a corresponding hole in the flange of the other a bolt $c^7$ is passed, as shown in Figs. 4, 7, and 8. By these means, as will be seen, a rigid and continuous bearing-surface the length of both of the curvilinear plates is interposed between the arms or struts $c$ and the interior of the hole or between such arms and a suitable blocking arranged therein and the parts thereof formed by the individual plates left free for separation when it is desired to swing the arms or struts back out of operation, as in Fig. 5, or to remove them from their supporting-pintle, as in Fig. 9.

To prevent the lifting of the end of the pole next the derrick during the raising of the pole from a recumbent to a vertical position or lowering it from a vertical to a recumbent position, the dog D is employed. This dog may be constructed in various forms. I prefer, however, to construct it with a toothed head $d$ for engagement with the pole and with two backwardly-extending arms $d'$, which are so pivoted with respect to the derrick that when the dog is not in use it normally hangs with its head in close relationship to the face of the mast or post, while yet left free to be swung outward therefrom to the required distance for engagement with the pole when its services are demanded. In Figs. 1 and 2 I have shown it as pivoted directly to the mast or post A by a bolt $d^2$, while in Fig. 12 I have shown it as pivoted to a sleeve $d^3$, which is fitted to slide upon the mast or post A and be secured in any adjusted position thereon by a set-screw $d^4$, a suitable stop $d^5$ being employed in both cases to limit the outward-swinging movement of the dog, if required.

Coöperating with the parts above described is a block and tackle E, by means of which the pole when raised to a vertical position may be lowered into the hole or raised therefrom preparatory to being lowered into a recumbent position. This block and tackle may be of any of the well-known forms and may be suspended from any convenient point on the face or side of the mast or post A near its upper end. I prefer, however, to employ a tackle of the differential form and to suspend it from a suitable hook $e$, which, although shown as applied to the upper end of the face of the mast or post, may be applied to the side thereof, if desired, as before explained.

In Figs. 1, 2, and 3 I have shown the bracket B of the winch fixedly secured to the mast or post A by bolts or rivets $f$; but this is unessential, and the same may be adjustably secured thereto by gibbing it to one of the flanges and holding it in an adjusted position thereon by a binding-screw $f'$, as shown in Fig. 13. Again, in Figs. 1, 2, and 3 I have shown the bearing-plate $a^2$ as fixedly secured to the mast or post; but this is also unessential, and the same may be detachably secured thereto by simply providing it with an appropriately-shaped groove $g$, which is adapted to engage and fit the flange thereon, as shown in Fig. 10.

With the parts constructed and arranged as above explained the operation of the derrick is as follows: The pole-hole having been dug and properly prepared and the desire being to raise a pole, the derrick is stood up in the former with the back of the mast or post and the bearing-plate $a^2$ thereon in contact with one side of the same. The arms or struts $c$ and curvilinear plates $c'$, hinged thereto, are then adjusted so as to bring the latter in contact with the opposite side of the hole or any suitable blocking arranged in front of the same, and the pole to be raised—as, for instance, that indicated by the letter F—is so disposed as to bring its lower end against the face of the mast or post A, with the dog D engaging with its upper side. The block and tackle E is then attached to the lower end of the pole by a chain or otherwise and the cord or chain C in like manner also secured to said pole at a point near the middle of its length, all as shown in Fig. 1. Power is then applied to the winch by rotating the shaft $b'$ through the cranks $b^3$, and the pole thereby raised to a vertical or approximately a vertical position around the point of attachment of the block and tackle E thereto, which block and tackle will during this time be so operated as to hold the pole from injurious contact with the curvilinear plates $c$ and prevent the latter from descending to any considerable depth in the hole until after it is raised to a vertical or nearly a vertical position, when the former will then be so operated as to lower the pole and properly seat it in the hole, the lower end of the pole in sliding down along the face of the mast or post A being engaged by the V-shaped flange $a^3$ on the face of the latter, and thereby prevented from slipping to one or the other sides thereof. The pole having been raised to a vertical position, or nearly so, and seated in the hole prepared to receive it will be held in that position by suitable props or guys, the cord or chain C and the block and tackle E disconnected therefrom, the bolt $c^7$ removed from the flange $c^6$ of the curvilinear plate $c'$, and the arms $c$ either swung upwardly into the position shown in Fig. 5 or removed from their pintle $c^5$, as shown in Fig. 9, when the derrick will be free for removal from the hole, ready for use in the next hole, and so on. On the other hand when it is the desire to lower a pole already standing the earth will first be removed from around it, so as to leave an appriate-shaped hole, and the derrick, with the arms or struts $c$ either turned upward into the position shown in Fig. 5 or removed therefrom, as in Fig. 9, stood up in the hole so formed at one side thereof, as shown in Fig. 1. The arms or struts $c$ will then be adjusted so as to bring the curvilinear plates $c'$ thereon in contact with the opposite side of the hole. The block and tackle E will then be secured to the lower end of the pole by a chain or otherwise, and the cord or chain C will in like manner be secured to the pole at a point near the middle of its length. The pole will then be raised from its hole and there held by the block and tackle and then lowered to a horizontal or recumbent position by a gradual movement through the intermediaries of the cord or chain C and the winch. The pole having been thus lowered, the arms or struts $c$ will be adjusted to their inoperative positions and the derrick removed from the hole ready for the next pole and the following.

It will thus be seen that I produce a derrick for raising and lowering telegraph-poles which is extremely simple in construction, powerful in operation, and admirably suited for the purposes for which it is intended.

In the foregoing I have described the best means contemplated by me for carrying my invention into practice; but I wish it distinctly understood that I do not limit myself strictly thereto, as it is obvious that I may modify the same in various ways without departing from the spirit thereof.

Having now described my invention and specified certain of the ways in which it is or may be carried into effect, what I claim as new, and desire to secure by Letters Patent of the United States, is—

1. The combination, with a mast or post adapted to enter the hole designed for the telegraph or other pole, and devices for engagement with the interior of such hole for holding the mast or post in an upright position, of a winch, and a cord or chain for coöperating therewith whereby to raise or lower a telegraph or other pole, substantially as described.

2. The combination, with a mast or post adapted to enter a pole-hole, a bearing-plate at its lower end, a sheave at its upper end, and devices for engagement with the interior of such hole for holding the mast or post in an upright position, of a winch secured to such mast or post, and a cord or chain cooperating with said winch and sheave whereby to raise and lower a telegraph or other pole, substantially as described.

3. The combination, with a mast or post adapted to enter the hole designed for the telegraph or other pole, and provided with a sheave at its upper end, and devices for engagement with the interior of such hole for holding the mast or post in an upright position, of a winch secured to such mast or post, a cord or chain for coöperating with said winch and sheave for raising or lowering a telegraph or other pole, and a block and tackle, substantially as described.

4. The combination, with a mast or post adapted to enter a pole or other hole, and provided with both a sheave at its upper end and a longitudinal flange extending outward from the lower portion of its face, of devices for engagement with the interior of said hole for holding the mast or post in an upright position, a winch secured to said mast or post, a cord or chain for coöperation with the winch and sheave for raising or lowering a telegraph or other pole, and a block and tackle, substantially as described.

5. The combination, with a mast or post adapted to enter a pole or other hole, a sheave at its upper end, and devices for engagement with the interior of such hole for holding the mast or post in an upright position, of a winch secured to said mast or post, a cord or chain for coöperation with such winch and sheave for raising or lowering a telegraph or other pole, and a dog for engagement with the lower end of the pole to prevent it from lifting during the time that a pole is being either raised from a recumbent to a vertical position, or lowered from a vertical to a recumbent position, substantially as described.

6. The combination with a mast or post, adapted to enter a pole or other hole, a sheave at its upper end, a winch secured thereto, and a cord or chain for coöperation with such winch and sheave, of arms or struts extending outward from said mast or post, and provided with plates on their ends for engagement with the side of said hole whereby to hold the mast or post in an upright position during the raising or lowering of a pole, substantially as described.

7. The combination, with a mast or post adapted to enter a pole or other hole, of arms or struts jointed thereto and extending outward laterally therefrom, and plates hinged to the extremities of these arms or struts for engagement with the interior of said hole to hold the mast or post in a vertical position against lateral strain, substantially as described.

8. The combination, with a mast or post, adapted to enter a pole or other hole, a sleeve adapted to slide longitudinally thereon, and a screw for holding it in adjusted position, of arms or struts pivoted to such sleeve, and provided at their ends with curvilinear plates hinged thereon whereby the said arms or struts may be swung down into a horizontal position or upward beside the mast or post, substantially as described.

9. The combination, with a mast or post, and arms or struts jointed thereto and extending outward laterally therefrom, of curvilinear plates hinged to the extremities of such arms or struts, and provided with inwardly-extending flanges at their inner contiguous ends, and a bolt for passing through such flanges to secure the plates together, substantially as described.

10. The combination, with a mast or post, and a bracket for supporting the drum and the drum-operating shaft of the winch, gibbed to the mast or post so as to be adjustable upwardly and downwardly thereon, of a binding-screw for holding such bracket in adjusted position, substantially as described.

11. The combination, with a mast or post, and a sleeve adapted to slide up and down thereon, of a dog pivoted to said sleeve, and a binding-screw for holding this sleeve in adjusted position on the mast or post, substantially as described.

In witness whereof I have hereunto set my hand this 16th day of February, 1898.

MINTHORNE T. GORDON.

Witnesses:

WM. H. APPLETON,

R. F. SWEENY.